US007727060B2

(12) United States Patent
Mills

(10) Patent No.: US 7,727,060 B2
(45) Date of Patent: Jun. 1, 2010

(54) LAND-BASED, ON-LINE POKER SYSTEM

(76) Inventor: Maurice Mills, 10110 SE. 226th Pl., Kent, WA (US) 98031

( * ) Notice: Subject to any disclaimer, the term of this patent is extended or adjusted under 35 U.S.C. 154(b) by 0 days.

(21) Appl. No.: 11/388,283

(22) Filed: Mar. 24, 2006

(65) Prior Publication Data

US 2007/0178955 A1 Aug. 2, 2007

Related U.S. Application Data

(60) Provisional application No. 60/699,688, filed on Jul. 15, 2005.

(51) Int. Cl.
*A63F 13/12* (2006.01)

(52) U.S. Cl. ............................ 463/13; 463/22; 463/40; 463/42; 273/292; 273/293; 273/309; 273/461; 902/23; 709/203; 715/744

(58) Field of Classification Search .................. 463/25, 463/46, 1, 9–13, 16–22, 29, 40–42; 273/274, 273/108.1, 138.1, 139, 142 B, 141 A, 142 A, 273/142 J, 148 A, 148 R, 148 B, 149 P, 149 R, 273/145 R, 147, 292–293, 304, 306, 309, 273/317.1, 351, 454–456, 460–461; 705/14, 705/26, 35, 36 R, 37, 42, 77; 902/10, 23; 709/203–207, 217–219, 225, FOR. 106, FOR. 115, 709/FOR. 122, FOR. 130, FOR. 131, FOR. 132, 709/FOR. 141, FOR. 148, FOR. 149, FOR. 153; 715/706, 738, 744, 757–758, 762–764; 704/E15.047; *A63F 13/12*

See application file for complete search history.

(56) References Cited

U.S. PATENT DOCUMENTS

| | | | | |
|---|---|---|---|---|
| 1,727,800 A | | 9/1929 | Albert | |
| 3,640,009 A | | 2/1972 | Komiyama | 40/2.2 |
| 3,751,041 A | | 8/1973 | Seifert | 273/149 |
| 4,534,562 A | | 8/1985 | Cuff | 273/149 |
| 4,889,367 A | | 12/1989 | Miller | 283/88 |
| 5,110,134 A | | 5/1992 | Laughlin | 273/293 |
| 5,169,155 A | | 12/1992 | Soules | 273/293 |
| 5,259,907 A | | 11/1993 | Soules | 156/277 |
| 5,312,104 A | | 5/1994 | Miller | 273/148 |
| 5,522,623 A | | 6/1996 | Soules | 283/91 |
| 5,669,816 A | | 9/1997 | Garczynski | 463/12 |
| 5,800,268 A | * | 9/1998 | Molnick | 463/40 |
| 5,945,655 A | * | 8/1999 | Gilgeous et al. | 235/454 |

(Continued)

*Primary Examiner*—Scott Jones
*Assistant Examiner*—Arthur O. Hall
(74) *Attorney, Agent, or Firm*—Dean A. Craine

(57) ABSTRACT

An on-line poker game system includes a poker table staffed with a live dealer with a plurality of designated seats assigned to at least one a remote player and one or more live players or to a plurality of remote players. Remote players connect to the system via a wide area network. Located at each designated seat is a private card camera that produces and transmits images of face down cards dealt thereto. A public card camera produces and transmits images of all face up cards dealt on the poker table. A table camera constantly provides an image of the entire table and dealer. A deck of cards with an identifying RFID tag is used with images to verify the identity of the private and public cards. A game logic server connects to a network server and host and client-side software programs enable the remote players to connect to the server.

16 Claims, 8 Drawing Sheets

U.S. PATENT DOCUMENTS

| | | | | |
|---|---|---|---|---|
| 6,039,650 | A * | 3/2000 | Hill | 463/47 |
| 6,042,150 | A | 3/2000 | Daley | 283/86 |
| 6,652,379 | B2 * | 11/2003 | Soltys et al. | 463/22 |
| 6,755,741 | B1 * | 6/2004 | Rafaeli | 463/25 |
| 2002/0094869 | A1 * | 7/2002 | Harkham | 463/42 |
| 2002/0147042 | A1 * | 10/2002 | Vuong et al. | 463/40 |
| 2005/0054408 | A1 * | 3/2005 | Steil et al. | 463/11 |
| 2005/0164761 | A1 * | 7/2005 | Tain | 463/13 |
| 2005/0272501 | A1 * | 12/2005 | Tran et al. | 463/29 |
| 2006/0030404 | A1 * | 2/2006 | Pohlman | 463/29 |
| 2006/0046853 | A1 * | 3/2006 | Black | 463/42 |
| 2006/0205508 | A1 * | 9/2006 | Green | 463/40 |
| 2006/0217199 | A1 * | 9/2006 | Adcox et al. | 463/40 |
| 2007/0015583 | A1 * | 1/2007 | Tran | 463/40 |

* cited by examiner

LAND-BASED, ON-LINE POKER SYSTEM

This utility patent application claims the benefit of the provisional patent application entitled "REALDECK VIRTUAL POKER ROOM," filed on Jul. 15, 2005 (Ser. No. 60/699,688).

BACKGROUND OF THE INVENTION

1. Field of the Invention

The present invention generally relates to card games, and more particularly to on-line poker games.

2. Description of the Related Art

There are two general categories of card games—card games played against a dealer and card games played against other players.

On-line card games played against a dealer, such as roulette, black jack, dice, and baccarat, have been developed. In these games, players located at different remote locations play against the dealer. These types of games frequently include different methods and mechanisms to transfer data from the casino to each player through the Internet or some other communication network. In these games, remote players are able to perform all the tasks commonly performed by physically present players.

Several methods of playing online card and casino games have been developed in the prior art. For example, U.S. Pat. No. 5,397,133 issued to Penzias discloses a system for playing card games remotely that includes a multimedia communication system, a card toaster, and an image recognition system at each game site. The toaster has the capability of reading, distributing, sorting, and finding cards. The image recognition system reads the cards that are manually played on the table and signals the card toaster, which distributes the same cards at other game location. However, this invention lacks any live video feed and requires the special gaming equipment, other than a computer, to be installed at all gaming locations.

In U.S. Pat. No. 6,508,709 issued to Karmarkar, a virtual gaming method and system is disclosed that uses a multimedia video or restricted pre-recorded video from randomly selected live casino games. The system includes an accounting subsystem, a remote player station, and a communication hub connecting the multimedia video source and the player accounting subsystem to the remote player station. The simplified wagering rules enable a remote player to concurrently play dissimilar games at the same gaming system. The technical features of this invention, for example, the players station's reliance on authentication sensors and gaming jurisdiction entitles, are overly complex and differ substantially from the present invention.

U.S. Pat. No. 6,575,834 issued to Lindo discloses an interactive system and method for playing table-type games at a casino. Terminals at remote locations receive a video display of the game, game players, game results, and game betting status signals from a distribution device, such as the Internet. Each terminal includes a means for electronically placing a bet. Each terminal is connected to a computer that is programmed with the required odds information for payoff when a player makes a winning bet. However, this patent is distinguishable from the present invention since the present invention's purpose is to enable a player to have a realistic table experience without having to be physically playing at the table.

U.S Pat. No. 5,800,268, issued to Molnick discloses a method by which remote players may participate in live casino game. Located in the casino is a table manned by a live dealer. Aimed at the table are cameras that display live images of the table to remote players interested in playing at the table. Prior to playing, each remote player must establish a communication link with the casino and transmits financial account information thereto. The casino utilizes this informtation and winnings are paid and loses are debited intantaneoulsy. During the course of a game, the casino transmits live images of the table to each remote player. Each remote player uses his or her computer to communicate game instructions to the dealer or to place bets.

Of all the online poker games that are currently in use, one aspect of game play involves random shuffling and card distribution. Current online poker games use random number generators (RNG) to determine random cards in play. However, the sites hosting the online poker games differ in their methods of initialization, known as seeding, how they use RNG's and the frequency with which they use RNG's. In some instances, a site will pull a random card when a card is required, in others the deck is set before the hand begins, and in other cases the deck is reshuffled at every stage of the hand. For example, when an action is chosen, what card comes next is determined based on the system time of the action. In this manner, current online poker games do not accurately simulate an actual shuffled deck of cards and therefore, cannot simulate live poker.

SUMMARY OF THE INVENTION

It is an object of the present invention to provide a land-based, online poker game played by live and remote players at a real poker table.

It is another object of the present invention to provide such an online poker game that uses a live dealer.

It is another object of the present invention to provide such an online poker game which transmits private information of the cards dealt to each remote player.

It is another object of the present invention to provide such an online poker game that transmits live images of the entire poker table to each remote player thereby enabling the remote players to see that the cards have been shuffled and dealt correctly and to make the game more authentic.

These and other objects of the invention are met by the land-based, online poker game system discussed herein that uses a poker table operated by a live card dealer who deals cards to live players sitting or standing at the poker table and to remote players that participate in the game via a wide area network. The system allows the live players and the remote players to play poker against each other at the poker table.

The poker table is divided into designated seats that are individually assigned to the dealer, to live players who want to sit at the table and to remote players who sign up remotely to participate. Located at or near each designated seat assigned to a remote player is a private card camera designed to transmit images of the 'face down' cards (hereinafter known as private cards) dealt to the remote player's designated seat. During play, the images of the private cards are instantaneously transmitted via the wide area network to the remote player assigned to the designated seat.

Attached or mounted on the poker table is an optional means for verifying the identity of the playing cards dealt to the designated seats. In the first embodiment, the means for verifying the identity of the playing cards is an identifying radio frequency identification device (hereinafter referred to as an RFID tag) attached to each playing card in the deck of cards used in the game. Located near the dealer is a RFID tag detecting device. During a poker game, the RFID tag on each card is detected by the detective device when the playing card is dealt to a designated seat. The identification code assigned to each RFID tag is then determined and transmitted via the wide area network to the remote player's computer assigned to the designated seat. The client side software program loaded into the remote player's computer reviews the identification code and then presents a simulated image of the private card on the remote player's display. In a second embodiment, the means for verifying the identity of the cards is a normal deck of playing cards and a scanner mounted on the poker table. The image of the playing card dealt to the designated seat assigned to the remote player is transmitted to the remote player's display. By comparing the live image and scanned images of the private cards, each remote player is able to verify that the playing cards actually dealt are being played. In a third embodiment, a bar code is printed or attached to each card which is read by a barcode scanner.

Mounted at or above the poker table or above each designated seat is an optional public card camera designed to provide images of all the 'face up' cards (hereinafter called public cards) dealt on the table. In the preferred embodiment, the images from the public card camera are transmitted to the dealer and to all of the remote players via the wide area network. Also mounted at or above the poker table is a table camera designed to provide a wide angle image of the entire table and the dealer to each remote player. By providing a wide angle image of the poker table and the dealer, each remote player is able to view the activities on the table at 'real' time and to verify that the cards are shuffled and dealt correctly.

The system includes a game logic server with a poker game managing software program loaded therein. The poker game managing software program enables the game logic server to act as a state machine capable of managing at least one poker game played between the live players and the remote players, or between the remote players. The system also includes a web server that connects the game logic server to the wide area network and to each remote player's personal computer. The system further includes a database server that stores each remote player data file and the specific game information files.

During a poker game, the dealer uses a dealer computer located near or adjacent to the poker table to monitor and receive instructions from the remote players. Loaded into the working memory of the dealer computer is a dealer side software program capable of inputting and receiving the remote players instructions and other data from the game logic server.

The remote player data file contains the remote player's personal information, his or her user name, and his or her password. When a remote player logs onto the system using his or her remote computer, a client side software program is loaded into the working memory of the remote computer which automatically checks for software program updates and verifies the remote player's username and password. Each remote player data file may include a funds subfile from which bets or winnings are withdrawn or deposited. A third party billing service may be used to transfer funds into and out of the remote player's fund subfile.

When the client side software program is activated on the remote player's computer, a list of tables and games currently being played or available are displayed. This list is presented in a simulated image of a casino lobby and hereinafter called a casino lobby menu. Shown on the casino lobby menu is a list of games (i.e. Texas Hold'em, Omaha, 7-card stud, etc.) that are currently being offered. Accompanying the list of games may be the name of the poker table, the number of open seats currently available at each table, the wager limits, if any, on each table, the number of players currently seated at each table, the average pot at each table, and the average amount of dollars in each pot that is won at each table. After reviewing the information on the casino lobby menu, the remote player then selects a game and a specific poker table. The remote player may then be presented with a log-on menu that allows him or her to log onto the system.

After the remote player's log-on information has been verified by the servers, and the balance in the player's funds subfile is checked an image from the selected poker table is presented on the remote player's display showing the location of one or more available seats. Once the seat is selected, images from the private card camera, the public card camera and the table camera are then automatically transmitted via the wide area network and displayed. The images from the cameras discussed above are shown in windows. Also provided is a game action menu with input buttons that enable the remote player to transmit instructions to the dealer regarding the disposition of his or her hand or whether the player elects to hold, place a bet, or fold. An optional chat window or audio feed may be transmitted to the remote player's display or computer that allows the remote player to communicate with the dealer and/or the other live or remote players during the course of the game.

An important aspect of the system is that a live dealer is used to shuffle and deal the cards and visible to the remote player's at all times. The dealer may use an automatic card shuffler, but remains visible to the remote players. Because the cards are physically dealt to the designated seats around the table, the need for a random number generator commonly used with online poker games found in the prior art is eliminated.

Another important aspect is that when private cards are dealt to each designated seat, the private card camera automatically transmits images of the private cards to the remote player assigned to the designated seat. When public cards are dealt in the center of the poker table or to the designated seats, their images are visible to everyone including all the remote players. The combined use of private card images, public card images, live table images, verification of the dealt playing cards, allows the system to be used in both live to live player games, live to remote player games, and in remote player to remote player games.

DESCRIPTION OF THE PREFERRED EMBODIMENT(S)

Figure 1:
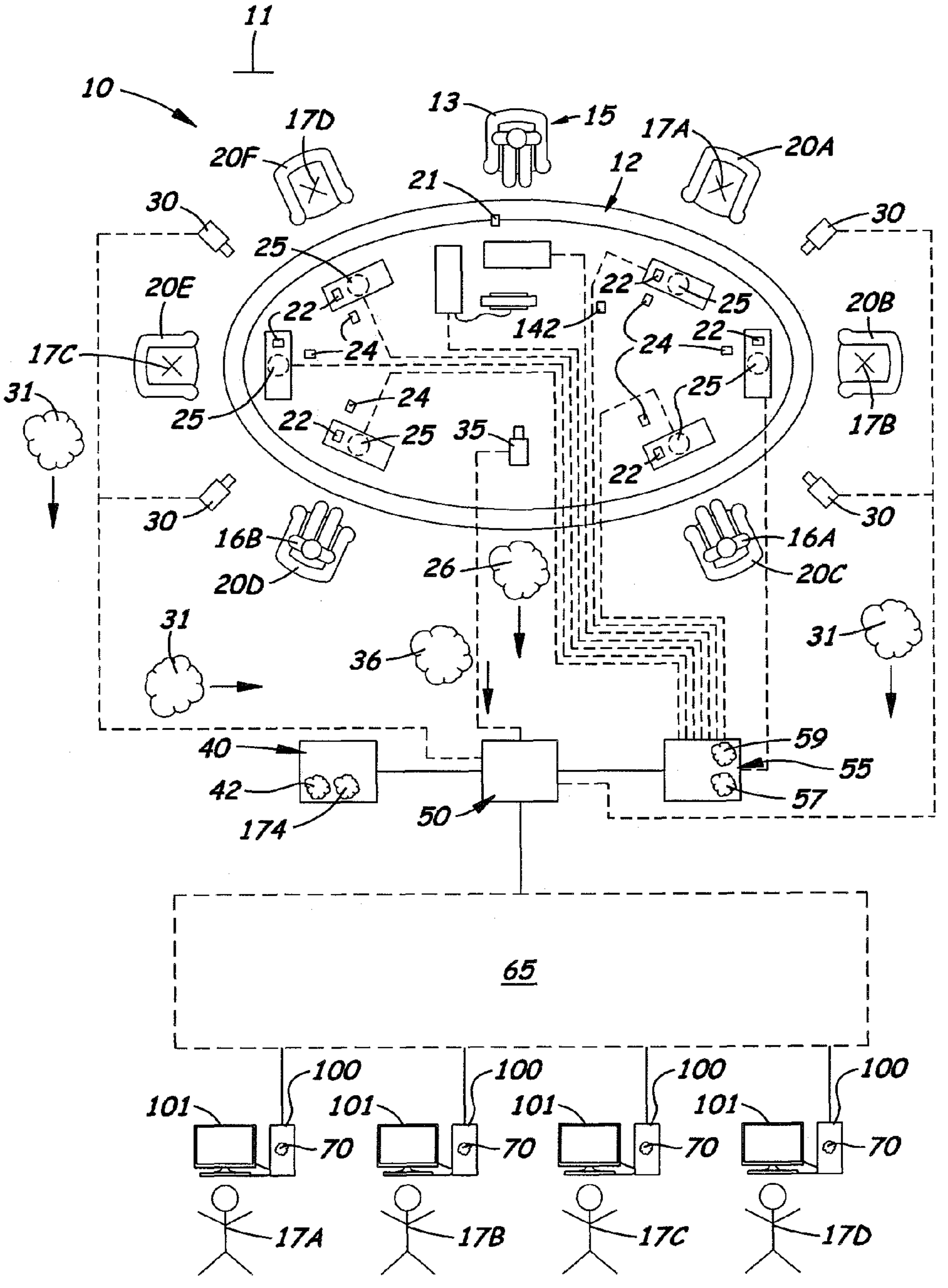
FIG. 1 is a diagram of the on-line poker system in accordance with the present invention.

Referring to the accompanying Figs. there is shown a land-based, online poker game system, generally referenced as 10, specifically designed to allow live player to live player, live player to remote player, and remote player to remote player, poker card games. The system 10 includes a facility 11 in which a poker table 12 is setup with a lure card dealer 15 assigned thereto. The poker table 12 is divided into a plurality of designated seats (six seats shown and denoted 20A-F) that are individually assigned to one or more live players (two shown denoted 16A and 16B), and to one or more remote players 17 A-D, (denoted as "X" in FIG. 1).

During a poker game, the dealer 15 consecutively deals individual playing cards from a deck of playing cards 21 to a live or remote player at each designated seat 20A-F. In poker, playing cards are dealt 'face down' to each designated seat and are called 'private cards' 22. In the center of the poker table 12, the playing cards are dealt 'face-up' and called 'public cards' 24. During a poker game, each player uses the private cards 22 and public cards 24 to build their best poker hand.

Figure 2:
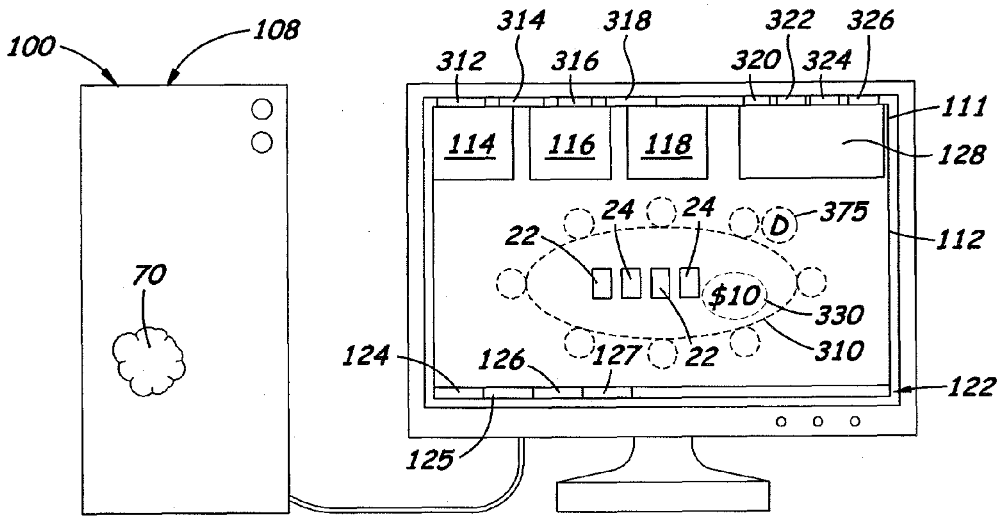
FIG. 2 is an illustration of a remote player's computer and display.

As shown in FIG. 1, located at or near each designated seat 20A-F is a private card camera 25 designed to transmit live images 26 of the private cards 22 dealt to a remote player 17A-D assigned to one of the designated seats, (20A, 20B, 20E and 20F are seats designated to remote players). The live image 26 of the private cards 22 produced by the private card camera 25 is instantaneously transmitted via a wide area network 65 to the display 101 connected to a computer 108 operated by the remote player 17A-D assigned to the designated seat 20A, 20B, 20E and 20F, respectively. The image 26 is displayed in a particular area, called a private card window 114 on the remote player's display 101 as shown in FIG. 2 and as described further below.

Mounted at or above the poker table 12 or above each designated seat 20 A-F, is an optional public card camera 30 designed to provide an image 31 of the public cards 24 dealt on the poker table 12. In FIG. 1, there are four public card cameras 30 placed around the poker table 12. It should be understood that the number of public card cameras 30 may vary depending on the type of games played and the number of seats. In the preferred embodiment, the image 31 from the public card camera 30 is also transmitted to all of the remote players 17A-D. The image 31 from the public card camera 30 is presented in a public card window 116 on the remote players's display 101 also as shown in FIG. 2 and described below.

Mounted at or above the poker table 12 is a table camera 35 designed to provide a wide angle image 36 of the entire poker table 12 to each remote player 17A-D. During a game, an image 36 of the entire poker table 12 and the dealer 15 is transmitted to each remote player 17A-D enabling him or her to verify that the deck 21 of playing cards is shuffled and dealt correctly and that the live players sitting around the poker table 12 are not cheating. The image 36 produced by the table camera 35 is presented in a table camera window 118 on the remote player's display 101 as shown in FIG. 2 and described below.

Figure 10:
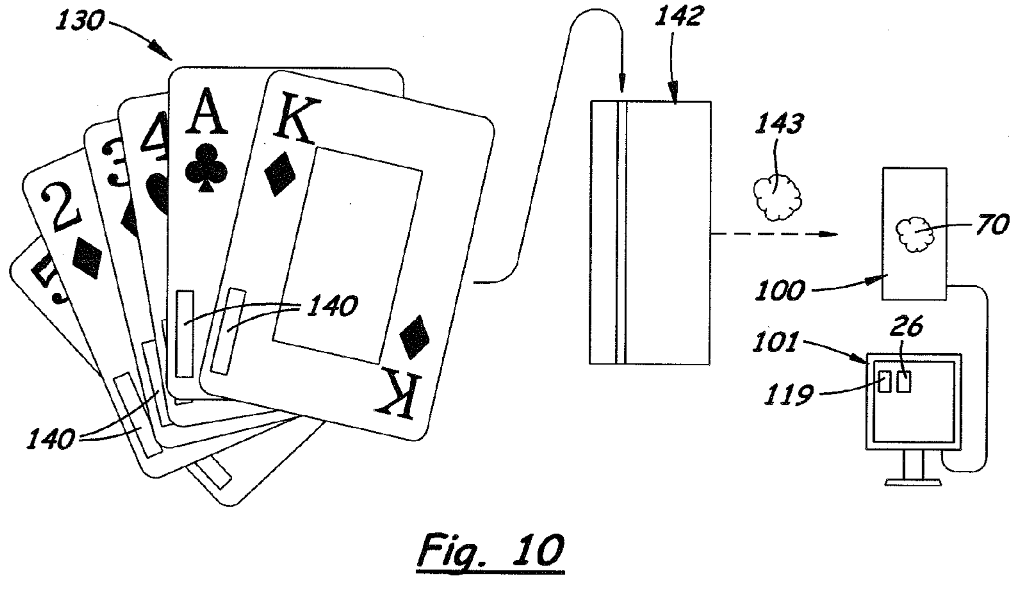
FIG. 10 is an illustration showing a deck of playing cards with an identifying RFID chip embedded on each card that is passed through an RFID detecting device and then transmitted to the remote player's computer and display.

Attached or mounted on the poker table 12 is an optional means for verifying the identity of the private cards 22 dealt to the designated seats 20 A-F. In the first embodiment, the means for verifying the identity of the private cards 22 is the use of a deck of playing cards 130 each with an identifying RFID tag 140 attached thereto as shown in FIG. 10. Mounted or attached to the poker table 12 adjacent to the dealer 15 (see FIG. 1) or near each designated seat 20A-F is a RFID detecting device 142 through which each playing card 130 is swiped before being dealt to each designated seat 20 A-F (see FIG. 10). An identification code 143 is assigned to each RFID tag 140 that is then transmitted via the wide area network 65 to the computer 100 operated by the remote player 17A-D assigned to one of the designated seats 20 A-F. A client side software program 70 loaded into the remote player's computer 100, processes the identification code 143 and then presents the simulated image 119 of the playing card 130 on the remote player's display 101. By comparing the live images 26 from the private camera 25 with the simulated images 119 of the playing cards 130 produced by the client side software program 70, each remote player 17A-D is able to verify that the playing card 130 actually dealt to the designated seat 20A-F are being played.

Figure 11:
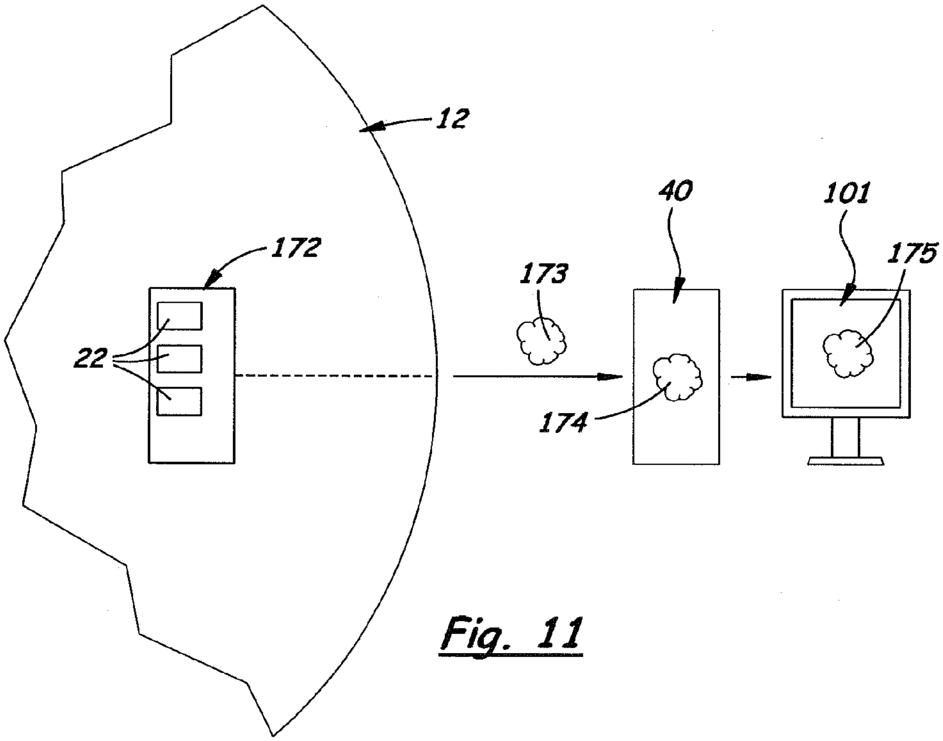
FIG. 11 is an illustration showing a section of the poker table with a scanner located at or near a designated seat that is coupled to a remote player's computer and display.

It should be understood that the means for verifying the identity of the private cards 22 may also be a standard deck of playing cards 21 and a scanner 172 built into or assembled on the poker table 12 or adjacent to each designated seat 20A-F as shown in FIG. 11. When a standard playing card 21 is dealt to the designated seat 20A-F, it is first passed over the scanner 172 and read. An OCR software program 174 located into the memory of the game logic server 40 discussed further below converts the digitalized scanned file 173 of the playing card 21 into a readable image file 175 capable of being transmitted and displayed on the private card window 114 on the remote player's display 101.

The system 10 includes a game logic server 40 with a poker game managing software program 42 loaded therein as shown in FIG. 1. The poker game managing software program 42 enables the game logic server 40 to act as a state machine capable of managing a poker game played between live players 16A, 16B, between live players 16A, 16B and remote players 17A-D, or between only remote players 17A-D. The system 10 also includes a web server 50 that connects the game logic server 40 to a wide area network 65, and a database server 55 that stores the remote player data files 57 and specific game information files 59.

Figure 7:
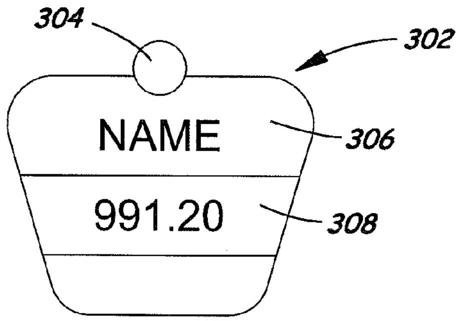
FIG. 7 is an illustration of a player info button displayed on the game action menu.
Figure 8:
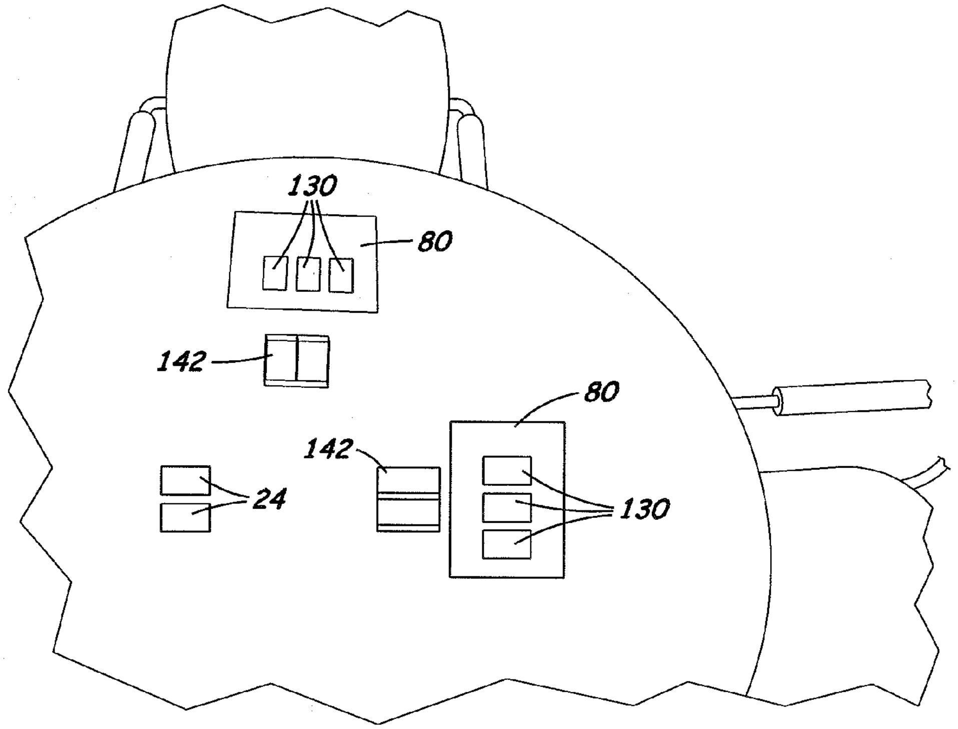
FIG. 8 is an illustration showing two designated seats on a poker table with three private cards placed face down on the transparent plate after being swiped through a RFID reading device.
Figure 12:
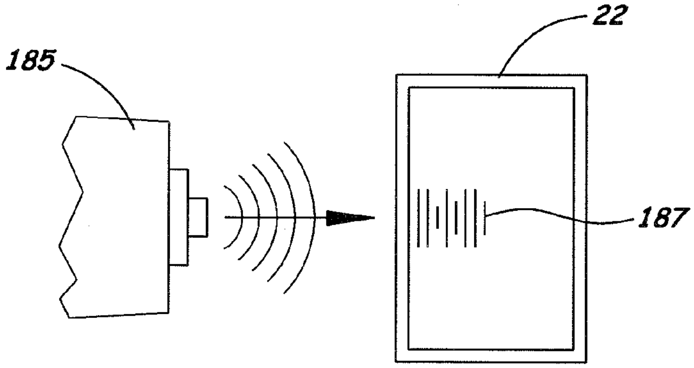
FIG. 12 is an illustration showing a bar code scanner being used to read an identifying bar code imprinted onto the surface of a playing card.

As stated above, the poker table 12 is setup in a gaming facility 11 that can accommodate a plurality of live players 16A, 168 and a plurality of remote players 17A -D. Preferably, the poker table 12 is limited to six to nine players total. It should be understood however, that the actual number of designated seats 20 A-F is limited only by the size and shape of the poker table 12 and the limits of game rules. In the preferred embodiment, a live dealer 15 manages the poker table 12 and physically sits at the designated dealer seat 13. The dealer 15 may manually shuffle a standard deck of playing cards 21 or deal an RFID tag embedded deck of playing cards 130. The dealer 15 may use an automatic card shuffler. When the dealer 15 deals the RFID tag embedded cards 130 to the remote players, he or she swipes them over the RFID device 142 and then places them 'face down' onto a glass plate 80 located at each designated seat 20 as shown in FIG. 7. If a standard deck of playing cards 21 and a scanner device 172 are used in place of the cards 131 and the RFID device 142, then the playing cards 21 are read by the scanner device 172 as shown in FIG. 11. Shown in FIG. 12, a third alternative method for verifying the cards is disclosed that uses a barcode imprinted deck of cards 22 each with an identifying barcode 187 on a surface back of a playing card 22 that is read by a barcode reader 185 located on the table.

Figure 9:
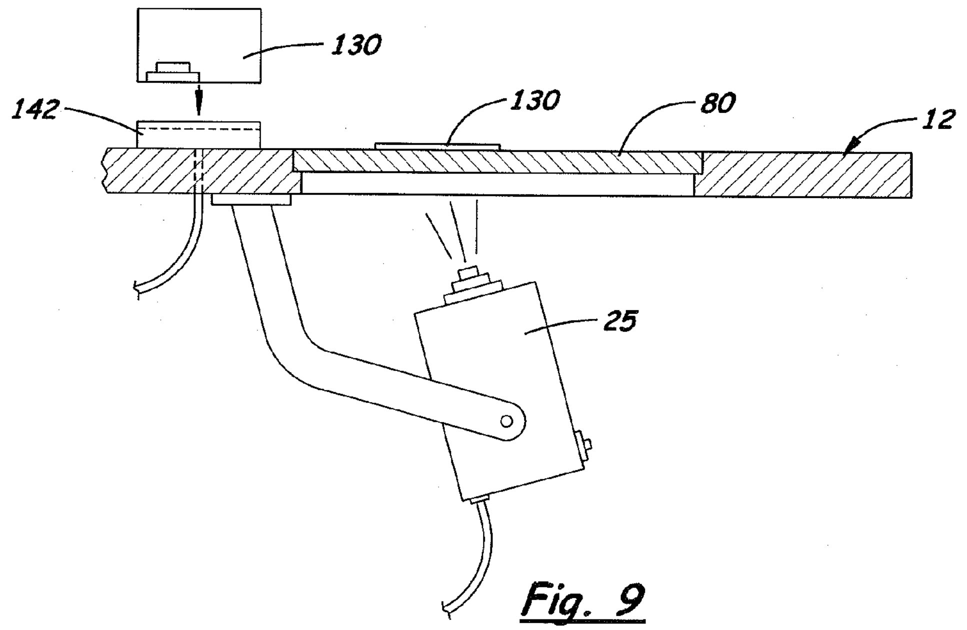
FIG. 9 is a sectional side elevational view of a designated seat showing the location of the transparent panel, the RFID device, and the private card camera.

As shown in FIG. 9, and described above a private card camera 25 is positioned at each designated seat. The camera 25 is positioned below the poker table 12 and aimed upward towards a transparent plate 80. When private cards 21, 22 or 130 are placed on the transparent plate 80, the image 26 of the private cards 21, 22 or 130 is transmitted to the remote player's display 101.

As shown in FIG. 1, the public card camera 25 is located above the poker table 12 and aimed for viewing all the public cards 24 dealt face up on the poker table 12. The table camera 35 is mounted above the poker table 12 and slightly higher than the public card cameras 30 so that the entire poker table 12, the dealer 15, the live players 16A, 16B and all of the designated seats 17 A-F may be viewed.

Figure 3:
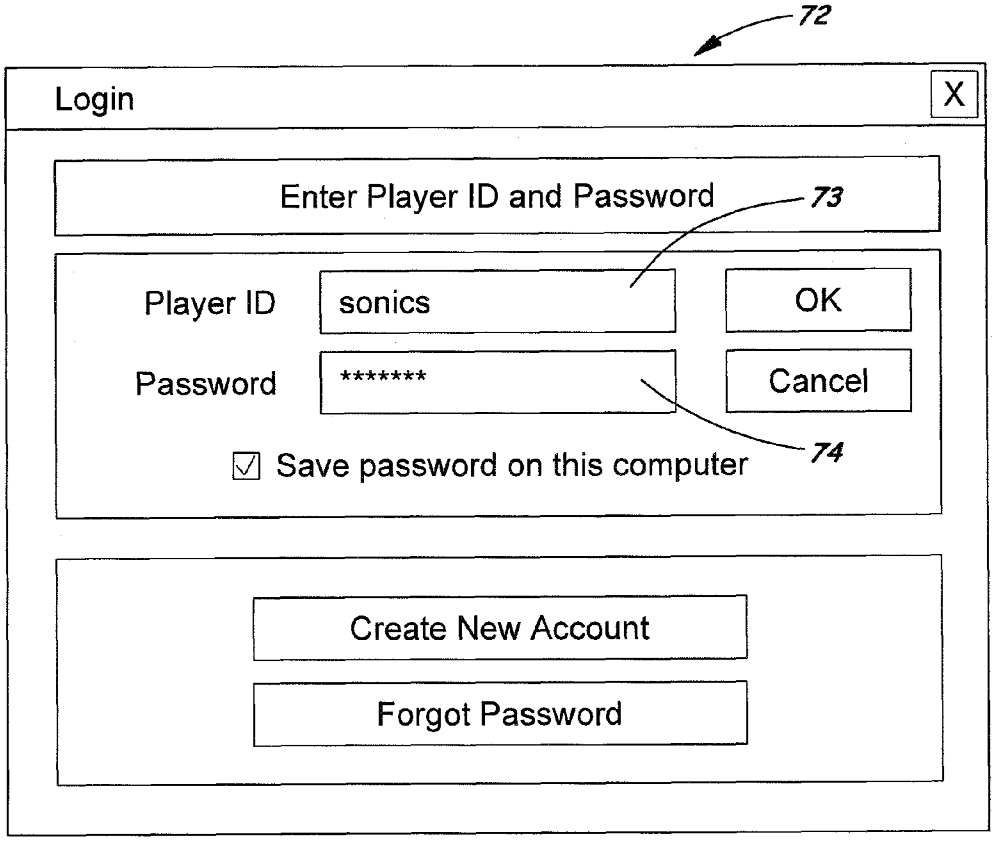
FIG. 3 is an illustration of the log-on menu used by the remote player to sign into the system.

Each remote player 17A-D accesses the system 10 via opening a link from a downloaded on non-downloaded version of a client side software program 70 used by a system 10. The client side software program 70 can be obtained from a game host website or one of its licensees. Each remote player's computer 100 must be connected via the wide area network 65 to a secure platform that comprises the outer shell of the gaming platform. Each remote player 17A-D logs onto the system 10 via a log-on menu 72 as shown in FIG. 3 which requires each player to type into his or her personal username and password in the appropriate box 73, 74 respectively.

Figure 4:
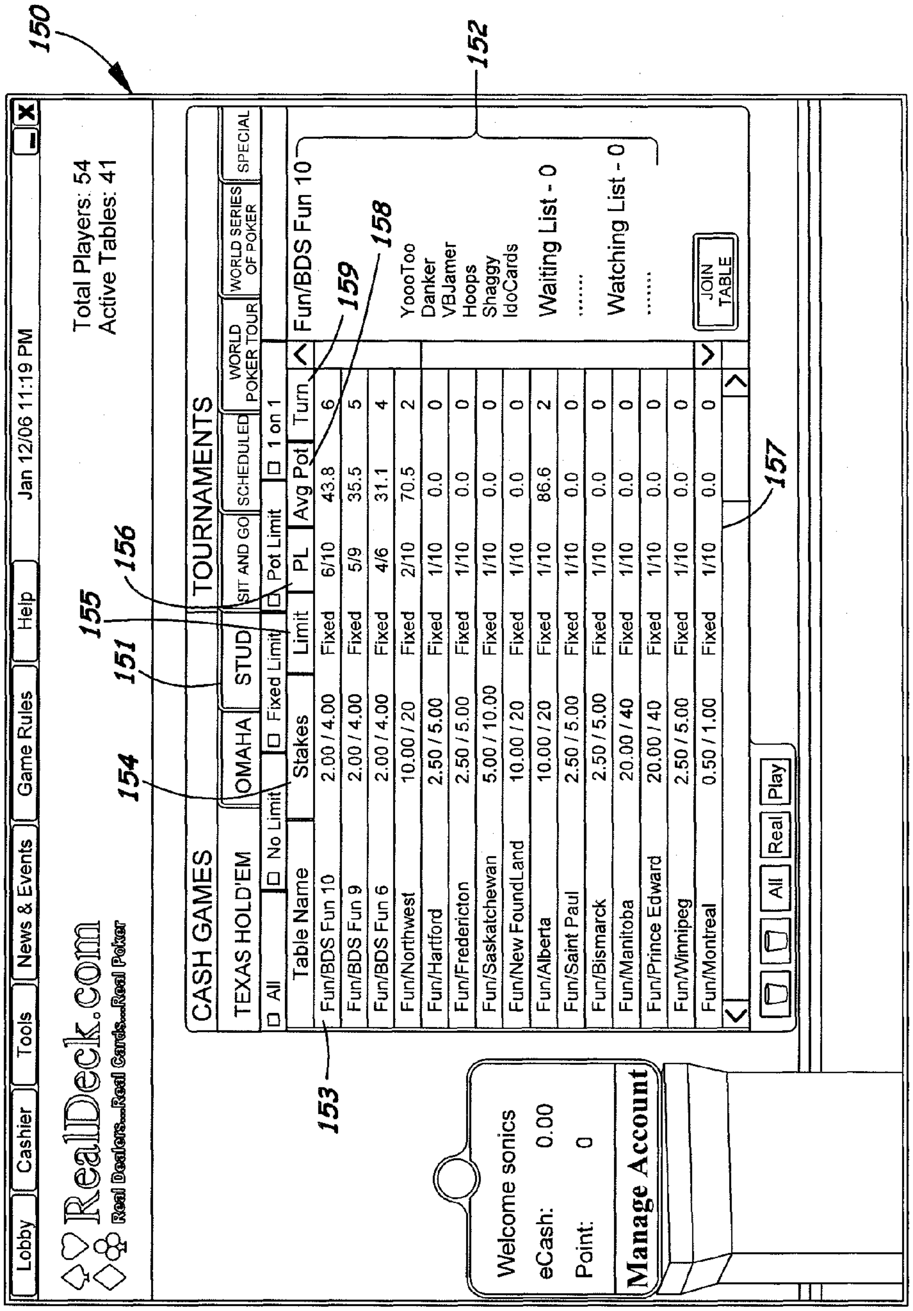
FIG. 4 is an illustration of the casino lobby menu showing the various games available to a remote player when they log onto the system.

After authenticating the player's username and password, the image of a casino lobby menu 150 is presented (see FIG. 4) that presents the types of games 151, a list of all of the games 152 currently available, the name of the tables 153, the stakes 154, the game limit 155, the number of seats at the table 156, current players 157, the average pot size 158, and the next player's in turn indicator 159.

Figure 5:
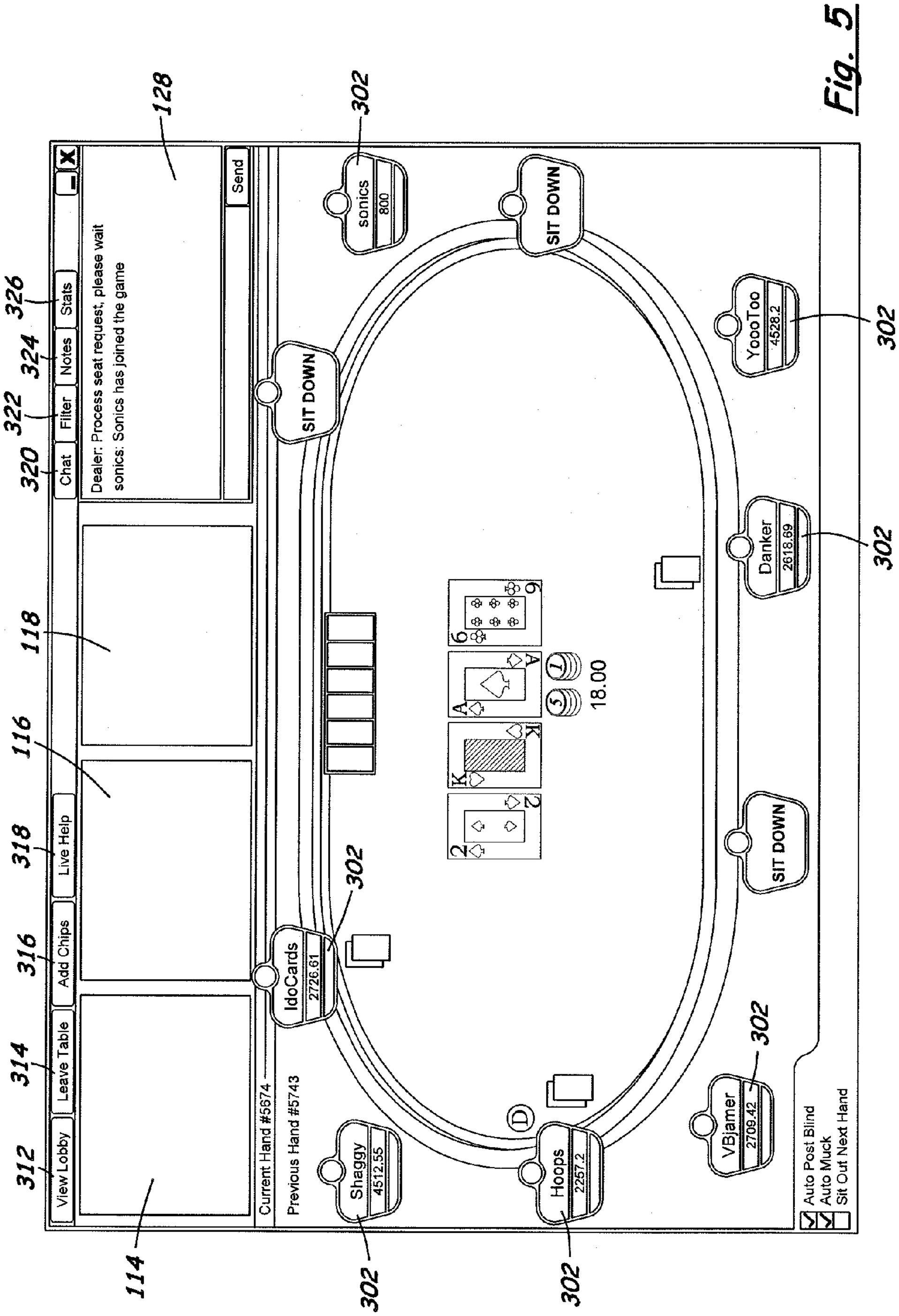
FIG. 5 is an illustration of a game action menu showing the poker table where a specific poker game is to be played with the designated seats assigned to remote players and live players before the remote player has been granted permission to join the game.

The client side software program 70 is loaded into the memory of each remote player's computer 100 and creates the log-on menu 72. Once logged onto the system 10, and a game is selected, a user interface 112 is produced on the remote player's display 101. FIG. 5 is an illustration of the user interface 112 showing the game action menu 113 after selecting a particular game has been selected but before a particular game is joined. Presented on the game action menu 113 is at least one open seat that the remote player must select before joining the game. In some instances, an open seat may be automatically assigned to the remote player when the remote players select the game from the casino lobby menu 150. When a seat is selected, the remote player must indicate the amount of money they would like to bring to the game. In some instances, the minimum or maximum amount of money that must be brought to the game may be presented on the casino lobby menu 150.

Each remote player is allowed to join a game based on their account balance and the wager limit of the game. Once the remote player selects a game and the poker table from the casino lobby menu 150, the game action menu 113 showing a simulated poker table 310 is displayed in the user interface 112. If there is no seat available in a current game, the remote player is prompted to join a waiting list and is notified when a seat becomes available. When all of the remote players have been assigned to a designated seat and have purchased chips, the game is then activated and ready for play.

Figure 6:
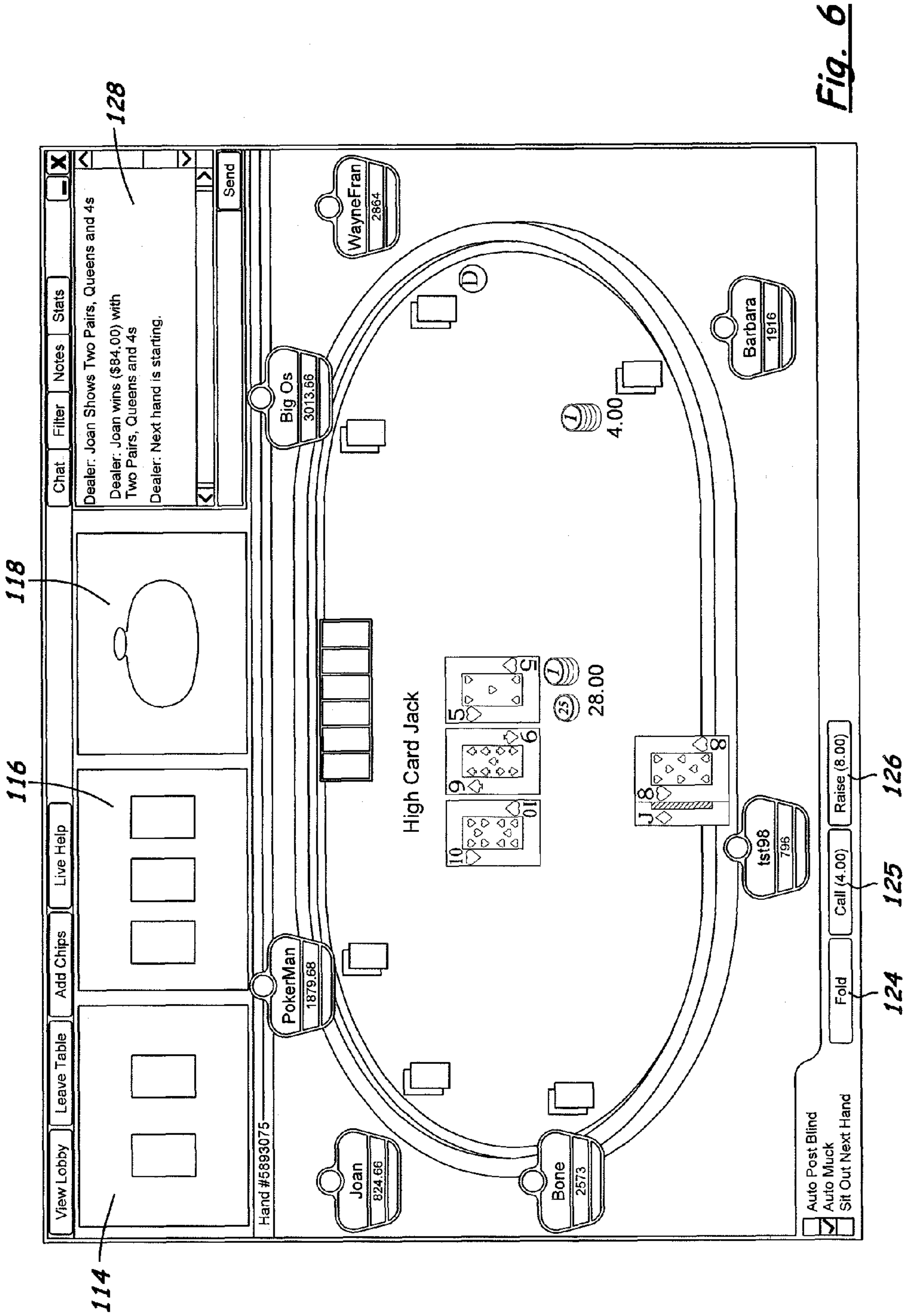
FIG. 6 is an illustration similar to the illustration shown in FIG. 5 showing a specific poker game being played by the remote player.

FIG. 6 is an illustration of the user interface 112 showing the game action menu 300 after the remote player has selected a seat and joined the game (seat number 6 shown selected, counting clockwise from the dealer). When the remote player joins a game, a player information box 302 is presented on the game action menu 300 adjacent to his or her designated seat. As shown in FIG. 7, the player information box 302 includes a visual indicator 304 that when activated, informs the remote player that it is his or her turn to play. As an optional feature, the visual indicator 304 may include a statement to remind the remote player the type of action that he or she has been previously taken. The player information box 302 includes a player nick-name box 306 and a game funds box 308.

FIG. 2, shows a simulated poker table 310 on the game action menu 300. Located on one side of the menu game action 300 is the private card window 114, a public card window 116, and a live table card window 118 as discussed above. During the course of a game, the live image 26 of the private cards 22 dealt to the remote player is shown in the private card window 114. The live image 31 of the public cards 24 are shown in the public card window 116. Images 36 of the poker table 12 taken by the table camera 35 are shown in the table view window 118. Located along the bottom of the game action menu 300 is an interactive section 122 that contains three action buttons 124-126 that the remote player uses to act on their poker hand in-turn. The action buttons 124-126 also have an option to act in advance on their hand prior to their turn to act. In the preferred embodiment, the action buttons 124-126 include a fold function, a call function and a raise function, respectively. Located in the upper corner of the game action menu 300 is an optional chat window 128 that allows the dealer, the live players and the remote players to chat during a game. Located along the left upper edge of the game action menu 300 are optional player management buttons 312, 314, 316, 318 that enable the remote player to view the casino lobby menu 150, temporarily leave table, add chips, and request help, respectively. Also, located along the right upper edge of the game action menu 300 is an ancillary window buttons 320, 322, 324, 326 that allow the remote player to chat, filter, take notes or view stats, respectively.

On the game action menu 300, a pot amount 330 is also displayed adjacent to the simulated poker table 306. In the preferred embodiment, a dealer visual indicator, indicated by the letter 'D', is shown next to a designated seat to designate the player who dealt the current hand. The dealer visual indicator 375 moves clockwise around the simulated poker table 310 to a new designated seat after each hand so that the each player has an opportunity to be the last player in a hand.

Using Texas Hold'em as an example, the live video image from the table camera 35 that allows each remote player 17A-D to watch the dealer 15 shuffle or put the deck of playing cards in the automatic card shuffler via the table card window 118. After the deck of cards are shuffled or taken out of the automatic card shuffler, the dealer 15 will then cut the deck of playing cards and deal them out in standard Texas Hold'em fashion with one card to each live player 16A, 16B and remote player 17A-D starting at the left of the dealer 15, then a second card to each person, etc. When the dealer 15 deals the deck of cards 21, 130 he or she first passes them over the RFID device 75 or scanner 172, so that their identity may be verify by the remote players. The private cards 22 are then placed on the transparent plate 80. The remote player 17A-D will be able to visibly see the two private cards 22, dealt facedown to them by the dealer 15, via the private card window 114 on the user interface 112. The public cards are also dealt to the center of the poker table 12 and may be seen in the public card window 116.

When it is the remote player's 17A, 17B turn to act on their hand, he or she have the standard options that are available in Texas Hold'em depending on position; Check, Fold, Call, Raise, Re-Raise etc. If the remote player 17A, 17B chooses not to play the hand, they will indicate they are folding by clicking the fold function button 124 with their computer mouse. The dealer 15 will then bring their cards in-turn and their fold action will be displayed on the graphical representation of the game. If the remote player 17A-D chooses to play the hand, they will indicate their action by clicking the proper function button 124-126. Their action is then carried out in-turn and can be viewed on the graphical representation of the game. Players also have the ability to tip the dealer 15 in customary fashion using an optional tipping button 360 on the interface 111.

All money wagered by a live or remote player visually shown as a total amount, using U.S. dollars as an example. Dollars are deducted from each player's starting chips in real-time on the user interface and updated on their current account balance. The game automatically pools together dollars wagered by each player and the collective amount of player wagers are illustrated on the graphical representation of the game for each player. A fee for hosting the game, called a "rake" may be automatically deducted during each hand. The rake will vary according to the size of the game and rules developed by the game host.

Using Texas Hold'em as an example, after all the live players 16A-B and remote players 17A-D have acted on their hand, the dealer 15 continues play and will "burn" one card and bring out a three-card flop which are community cards for all remaining players.

Once the winner of the hand is determined, the "pot" will be moved over to them on the graphical representation of the game and the dollar amount won, minus the "rake," which will be updated on their user interface with the current amount "in play" and on their main account. In the event of a split pot or side pot, the graphic interface for each player will automatically separate the pot according to the rules established for the game and award each player their portion of the pot. At the end of a hand, the dealer 15 will either shuffle the playing cards for the next hand or put them in the automatic card shuffler and take out a shuffled deck to deal the next hand.

Using the feature in the user interface 112, players in an existing game are given a prioritized option to move into seats that open up when another player leaves the poker table 12. This is available to simulate the custom in-person poker games where players already in a game get the first opportunity to take over a vacant seat.

The system 10 and method of the present invention contemplates mixed games. Mixed games occur when a combination of two or more types of poker games are employed in different hands during the same gaming session. Many current technologies of online poker that rely on graphic driver user interfaced are incapable of this feature.

The user interface 112 of the present invention is also capable of displaying webcam images in a window, enabling all players to see each other using their own private webcams during a game. This technology is particularly intended for games in which all players are webcam enabled.

If procedural questions or a need for a "floorman ruling" arises, the remote player 17A-D can click a help button (see FIG. 5) and type in a question on the chat window on their user interface 112. The dealer 15 may answer the question via chat window or audibly via microphone. If needed, a floor person on duty may type in a response and/or audibly answer the question and make the ruling.

To ensure the timely nature of game play, a timer feature, such as a clock 400 may be shown on the user interface 112 to prompt the remote player to act on a hand within a predetermined period of time. Once the live and remote players have completed their turns, the dealer 15 is prompted to take the next dealer action. After each dealer action, the game automatically manages final betting awarding the pot and instructing the dealer 15 to collect the public and private cards and prepare for the next deal.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

While specific systems and methods have been disclosed in the preceding description, it should be understood that these specifics have been given for the purpose of disclosing the principles of the present invention and that many variations thereof will become apparent to those who are versed in the art. For example, the number of players can be varied and the user interface may include additional sections of windows.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An on-line poker game system, comprising:

a. a card room containing a poker table with designated seats to be assigned to physically located and remotely located players;

b. at least one dealer assigned to said poker table, said dealer not assigned to a designated seat to be assigned to players physically located or players remotely located, said dealer deals playing cards to designated seats on said poker table;

c. at least two players assigned to said designated seats at said poker table with at least one player being located at a remote location from said card room, d. a wide area network;

e. a means for imaging face down playing cards includes a transparent panel located on said poker table at or near said designated seat and a private card camera aimed to view the bottom surface of a playing card placed face down on said transparent panel, said means for imaging located at each said designated seat assigned to each said player at a remote location, said private card camera being coupled to said wide area network to transmit an image of the face down cards only to said remote player assigned to said designated seat;

f. a single deck of fifty-two standard size playing cards to be played at said poker table;

g. at least one public card camera located above said poker table or at or near each said designated seat used to create and transmit an image of face up cards dealt on said poker table;

h. a game logic server including working memory with at least one poker game managing software program loaded therein, said poker game managing software program enabling said game logic server to act as a state machine to managing a poker game played between said players assigned to said designated seats at said poker table;

i. a web server connected to said wide area network and to said game logic server;

j. a remote computer operated by said each player at a remote location and assigned to one said designated seat on at said poker table, said remote computer including working memory, said remote computer connected to said wide area network, and a display; and, k. a client side software program loaded into said working memory of each said remote computer operated by a player located at a remote location, said client side software program used to present a menu listing the type of poker game or the number of poker tables available, said client side software program used to connect via said wide area network to said game logic server and to receive instructions and data from said game logic server, said client side software program also used to communicate with said public card camera to display the images of face-up playing cards dealt on said poker table and to communicate with said means for imaging face down playing cards to display the face-down playing cards dealt to said designated seat assigned to said player at said remote location, said client side software program also used to input poker game instructions from said player at said remote location via said remote computer to said game logic server.

2. The on-line poker game system, as recited in claim 1, further including means for verifying the identity of said face down playing cards dealt to each said designated seat.

3. The on-line poker game system, as recited in claim 2, wherein said means for verifying the identity of said face down playing cards is a deck of playing cards with each card including an identifying RFID tag located thereon and at least one RFID detecting device used to detect said RFID tag when the playing card is swiped through said RFID detecting device.

4. The on-line poker game system, as recited in claim 2, wherein said means for verifying the identity of said playing cards dealt in a face down matter and an image recognition software program configured to process the image information from said scanner and creating a transferable, readable image file that can be sent to said player at a remote location.

5. The on-line poker game system, as recited in claim 4, further including a database server connected to said game logic server, said database server being used to record specific game information.

6. The on-line poker game system, as recited in claim 2, wherein said means for verifying the identity of said playing cards dealt in a face down matter to each said designated player seat currently assigned to a remote player is a deck of cards with an identifying barcode associated with each playing card and a barcode reader located near said dealer.

7. The on-line poker game system, as recited in claim 6, further including at least one public card camera used to create an image of face up cards dealt on said poker table.

8. The on-line poker game system, as recited in claim 6, further including a database server connected to said game logic server, said database server being used to record specific game information.

9. The on-line poker game system, as recited in claim 2, further including a database server connected to said game logic server, said database server being used to record specific game information.

10. The on-line poker game system, as recited in claim 1, further including at least one table camera used to create an image of said dealer when dealing cards at said poker table, said table camera being coupled to each said remote computer enabling remote players to view said dealer dealing aid playing cards on said poker table.

11. The on-line poker game system, as recited in claim 10, wherein said client side software program creates an interface on said display that presents a separate image of face-up cards on said table from said public card camera, a separate image of said dealer when dealing cards from said table camera, a separate image of face-down playing cards dealt to said designated seat assigned to said remote player from said private card camera.

12. The on-line poker game system, as recited in claim 1, further including at least one table camera located above said poker table used to create an image of all of the face up cards on said poker table and said designated seats and said dealer, said table camera being coupled to each said remote computer enabling said players to view said face up cards and said dealer.

13. The on-line poker game system, as recited in claim 1, further including a database server connected to said game logic server, said database server being used to record specific game information.

14. A method for playing on-line poker game, comprising the following steps:

a. selecting a remote computer using a display, said remote computer includes a client side software program used to communicate with an on-line poker game system, said client side software program used to present a menu listing the types of poker games or poker tables available for playing;

b. connecting said remote computer to a wide area network;

c. connecting said remote computer to an on-line poker game system connected to said wide area network, said game system includes one or more poker games, each said poker game includes a poker table with a card dealer who deals playing cards for a game of poker to be played at said poker table, said poker table includes a plurality of designated seats, each said designated seat being assigned to a player located at said poker table or to a player located at a remote location and connected to said game system using said remote computer, each said designated seat assigned either to a player adjacent to said table or assigned to a player at a remote location, each said designated seat includes a transparent panel located on said poker table at or near said designated seat and a private card camera configured to view the bottom surface of face down playing cards dealt onto said transparent panel, said transparent panel and said private card camera located at each said designated seat assigned to each said player at a remote location, said poker game system also includes at least one public card camera that transmits images of playing cards dealt face-up on said poker table, said poker game system also a game logic server connected to said wide area network with a poker game managing software program loaded therein, said poker game managing software program configured to manage a poker game played at said poker table by remote players assigned to said designated seats;

d. logging onto said system using said remote computer;

e. receiving a menu containing a list of poker games or poker tables currently available on said poker game system;

f. selecting a specific poker game or a poker table from said list of poker games or poker table shown in said menu;

g. receiving, using a client side software program, a game menu presented on said display when a poker game or poker table is selected, said game menu includes a simulated poker table that shows the location of said designated seats occupied by a player located at said poker table or at a remote location, said game menu also includes a plurality of poker game action buttons used to select different activities or decisions made during a poker game;

h. choosing an unassigned designated seat on said poker table, and;

i. playing a game of poker with a card dealer assigned to said poker table, with a single deck of fifty-two standard size playing cards; and with one or more other players assigned to another said designated seat at said poker table, wherein said client side software program is loaded into working memory of said remote computer operated by said player located at a remote location, said client side software program used to connect via said wide area network to said game logic server and to receive instructions and data from said game logic server, said client side software program also used to communicate with said public card camera to display the images of face-up playing cards dealt on said poker table and to communicate with said transparent panel and said private card camera to obtain images of said face down playing cards so as to display the face-down playing cards dealt to said designated seat assigned to said player at said remote location, said client side software program also used to input poker game instructions from said player at said remote location via said remote computer to said game logic server.

15. A method for playing on-line poker game, as recited in claim 14, wherein said system on-line poker game system further includes a table camera that transmits an image of the dealer dealing cards at said poker table to each said remote computer.

16. An on-line poker game system, comprising:

a. a card room containing a poker table with designated seats located thereon;

b. at least one dealer assigned to said poker table, said dealer deals playing cards used in a poker game to designated seats on said poker table assigned to players physically located at said poker table or players remotely located from said card room;

c. at least two players assigned to said designated seats at said poker table with at least one player being located at a remote location from said card room;

d. a wide area network;

e. a means for imaging face down playing cards includes a transparent panel located on said poker table at or near said designated seat and a private card camera aimed to view the bottom surface of a playing card placed face down on said transparent panel, said means for imaging located at each said designated seat assigned to each said player at a remote location, said private card camera being coupled to said wide area network to transmit an image of the face down cards only to said remote player assigned to said designated seat;

f. a deck of fifty-two playing cards to be played on said poker table;

g. at least one public card camera located above said poker table or at or near each said designated seat used to create and transmit an image of face up cards dealt on said poker table;

h. at least one table camera used to transmit images of said dealer when dealing cards at said poker table;

i. a game logic server including working memory with at least one poker game managing software program loaded therein, said poker game managing software program enabling said game logic server to act as a state machine configured to manage a poker game played between said players assigned to said designated seats at said poker table;

j. a web server connected to said wide area network and to said game logic server;

k. a remote computer operated by said each player at a remote location and assigned to one said designated seat at said poker table, said remote computer including working memory, said remote computer connected to said wide area network, and a display; and, l. a client side software program loaded into said working memory of each said remote computer operated by a player located at said remote location and configured to connect to said game logic server via said web server and said wide area network, said client side software program used to send and receive instructions and data from said game logic server, said client side software program used to present a menu that lists the types of poker game available or a list of poker tables available, said client side software program used to display an interface that presents a simulated poker table showing the locations of said designated seats occupied by players at said poker table or at a remote location, said menu also presents a separate image of face-up cards on said table from said public card camera, a separate image, which is received from said table camera, of said dealer when said dealer is dealing cards, and a separate image, which is received from said means for imaging face down playing cards, of face-down playing cards dealt to said designated seat assigned to said remote player, said client side software program also used to input poker game instructions from said player at said remote location to said game logic server.

* * * * *